(12) United States Patent
Srivastava et al.

(10) Patent No.: US 11,631,047 B2
(45) Date of Patent: Apr. 18, 2023

(54) SYSTEM AND METHOD OF GEOCODING

(71) Applicant: FLIPKART INTERNET PVT. LTD., Bangaore (IN)

(72) Inventors: Vishal Srivastava, Bengaluru (IN); Priyam Tejaswin, Bengaluru (IN); Lucky Dhakad, Bengaluru (IN); Amar Kumar Dani, Bengaluru (IN); Mohit Kumar, Bangalore (IN)

(73) Assignee: FLIPKART INTERNET PVT. LTD., Bangalore (IN)

( * ) Notice: Subject to any disclaimer, the term of this patent is extended or adjusted under 35 U.S.C. 154(b) by 168 days.

(21) Appl. No.: 16/846,186

(22) Filed: Apr. 10, 2020

(65) Prior Publication Data
US 2020/0364659 A1 Nov. 19, 2020

(30) Foreign Application Priority Data
Apr. 12, 2019 (IN) .............................. 201941013075

(51) Int. Cl.
| | |
|---|---|
| *G06F 16/29* | (2019.01) |
| *G06Q 10/083* | (2023.01) |
| *G06F 40/284* | (2020.01) |
| *G06F 40/289* | (2020.01) |
| *G06Q 30/0204* | (2023.01) |
| *G01S 19/39* | (2010.01) |

(52) U.S. Cl.
CPC ......... *G06Q 10/0838* (2013.01); *G06F 16/29* (2019.01); *G06F 40/284* (2020.01); *G06F 40/289* (2020.01); *G06Q 30/0205* (2013.01); *G01S 19/396* (2019.08)

(58) Field of Classification Search
CPC ...... G06F 16/29; G06F 16/9537; G06F 16/00; G06F 40/284; G06F 40/289; G06Q 10/0838; G06Q 30/0205; G01S 19/396
See application file for complete search history.

(56) References Cited

U.S. PATENT DOCUMENTS

| | | | | |
|---|---|---|---|---|
| 8,477,151 | B2 * | 7/2013 | He .......................... | G06T 11/206 |
| | | | | 345/619 |
| 2007/0015119 | A1 * | 1/2007 | Atenasio ............... | G09B 29/106 |
| | | | | 434/130 |
| 2007/0135993 | A1 * | 6/2007 | Riise ...................... | G06Q 30/02 |
| | | | | 455/456.1 |
| 2008/0162513 | A1 * | 7/2008 | Biard ..................... | G01C 21/28 |

(Continued)

*Primary Examiner* — Wilson W Tsui
(74) *Attorney, Agent, or Firm* — Klarquist Sparkman, LLP (57) ABSTRACT

Methods and systems are provided for geocoding. An example method encompasses receiving, from a delivery data corpus, a delivery data comprising one or more addresses. The method thereafter comprises identifying, one or more tokens from said one or more addresses. Further the method leads to calculating, for each of said one or more tokens, an end token score and a sub-sequence token score. The method thereafter encompasses chunking, said one or more addresses based on said end token score and said sub-sequence token score to generate one or more address chunks. Further the method comprises generating, one or more polygon regions for each generated address chunks based on said chunking. Thereafter the method comprises merging, one or more generated polygon regions for each of the generated address chunks.

11 Claims, 5 Drawing Sheets

(56) References Cited

U.S. PATENT DOCUMENTS

| | | | | |
|---|---|---|---|---|
| 2012/0278339 A1* | 11/2012 | Wang | ............... | G06F 16/29 |
| | | | | 707/748 |
| 2013/0262530 A1* | 10/2013 | Collins | ............ | G06Q 40/08 |
| | | | | 707/812 |
| 2014/0280160 A1* | 9/2014 | Scriffignano | ............ | G06F 16/29 |
| | | | | 707/737 |
| 2016/0003637 A1* | 1/2016 | Andersen | ............ | G06Q 10/10 |
| | | | | 701/519 |
| 2016/0171557 A1* | 6/2016 | Fanous | ............ | G06F 16/955 |
| | | | | 705/14.66 |
| 2019/0197483 A1* | 6/2019 | Li | ............... | G06Q 10/1053 |
| 2020/0134014 A1* | 4/2020 | Tiwari | ............ | G06F 40/211 |

* cited by examiner

SYSTEM AND METHOD OF GEOCODING

FIELD

The field generally relates to geolocation information associated with addresses and more specifically to improved systems and methods of geocoding of one or more addresses.

BACKGROUND

The following description of related art is intended to provide background information pertaining to the field of the disclosure. This section may include certain aspects of the art that may be related to various features of the present disclosure. However, it should be appreciated that this section be used only to enhance the understanding of the reader with respect to the present disclosure, and not as admissions of prior art.

In recent years, there has been increased popularity of e-commerce spreading from urban cities to smaller cities, towns and even some rural areas. With the increasing adoption of e-commerce, it has become significantly important to develop geocoding systems and methods that can efficiently convert addresses into geographic coordinates and thus, enable easy delivery of products and services. Although there has been some developments in this field, the challenges associated with efficient and correct geocoding still remain. One of the major challenges of existing geocoding systems is their inability to deal with unstructured nature of addresses. Specifically, developing countries like India, do not follow any consistent pattern or hierarchical structure in addresses. It therefore becomes difficult for the existing geocoding systems to extract valid chunks of data from such unstructured addresses.

Further, addresses sometimes also include popular local references and aliases. For instance, an address may include a reference to "Wipro Signal" which is a commonly used local reference for the intersection near Wipro park in Bengaluru. Similarly, words such as "marg" or "path" are used to refer to roads in Delhi while there are other aliases for roads in other cities. It is not possible for the existing geocoding methods to identify such aliases or local references and interpret them correctly.

In view of the above, there exists an apparent need to develop more efficient geocoding systems and methods that overcome the challenges of the prior art as well as provide a robust solution to the afore-mentioned problems.

SUMMARY

This section is provided to introduce certain objects and aspects of the present disclosure in a simplified form that are further described below in the detailed description. This summary is not intended to identify the key features or the scope of the claimed subject matter.

In order to overcome at least a few problems associated with the known solutions as provided in the previous section, an object of the present disclosure is to provide a novel method and system for geocoding of one or more addresses. It is another object to build a reference data corpus or database from historical delivery data and then using said reference data corpus to determine the geolocation of an address. Also, one other object is to build a task specific corpus from one or more user-delivery data, which would allow the system to capture the variations with which tokens/words are used by different people. Yet another object is to make use of one or more polygons as the core data structure through the entire process as opposed to point representations.

In order to achieve the aforementioned objectives, the present disclosure provides a method and system for geocoding.

One aspect relates to a method for geocoding. The method comprises receiving, at a processing unit from a delivery data corpus, a delivery data comprising one or more addresses. The delivery data comprises at least one of a customer address field, a delivery coordinate and a GPS accuracy. The customer address field may further include but not limited to one or more address fields such as line1, line2, pin code field and the like. Thereafter the method leads to identifying, by the processing unit, one or more tokens from said one or more addresses. The method further encompasses calculating, by the processing unit, for each of said one or more tokens, an end token score and a sub-sequence token score. The method thereafter leads to chunking, by the processing unit, said one or more addresses based on said end token score and said sub-sequence token score to generate one or more address chunks. Further the method comprises generating, by the processing unit, one or more polygon regions for each generated address chunk based on said chunking. Thereafter the method comprises merging, by the processing unit, one or more generated polygon regions for each of the generated address chunk. Also, further said process of merging by the processing unit, one or more generated polygon regions for each of the one or more address chunks is based on geographical intersection and a text similarity of said one or more polygon regions. Furthermore, the method also comprises pre-processing said customer address field of said delivery data, wherein said pre-processing comprises at least one of a removal of special characters, a removal of uppercase characters, a removal of alphanumeric characters, a segmentation of concatenated tokens and a removal of typographical errors. Also, the removal of typographical errors and said segmentation of concatenated tokens is based on a reference corpus unique to a pin code. Further, the method also comprises receiving, by an identification unit, a new address for geocoding. Further the method comprises pre-processing by the processing unit, said new address, wherein said pre-processing comprises at least one of a removal of irrelevant characters, a segmentation of concatenated tokens and a removal of typographical errors. Thereafter the method encompasses chunking, by the processing unit, said pre-processed new address based on an end token score and a sub-sequence token score of the new address to generate one or more address chunks of said new address. The method then leads to retrieving, by the identification unit, one or more polygons from a storage unit based on a chunk similarity metric for said one or more address chunks of said new address. Also, the method thereafter comprises ranking, by the identification unit, said retrieved one or more polygons based on a ranking criteria.

Another aspect relates to a system for geocoding. The system comprises a processing unit, configured to receive from a delivery data corpus, a delivery data comprising one or more addresses. Further, the delivery data comprises at least one of a customer address field, a delivery coordinates and a GPS accuracy. Also, the processing unit is further configured to pre-process said customer address field of said delivery data, wherein said pre-processing comprises at least one of a removal of special characters, a removal of uppercase characters, a removal of alphanumeric characters, a segmentation of concatenated tokens and a removal of typographical errors. Further, the removal of typographical errors and said segmentation of concatenated tokens is based on a reference corpus unique to a pin code. The processing unit of the system is further configured to identify one or more tokens from said one or more addresses. The processing unit is further configured to calculate, for each of said one or more tokens, an end token score and a sub-sequence token score. Also, the processing unit thereafter configured to chunk, said one or more addresses based on said end token score and said sub-sequence token score, to generate one or more address chunks. Further the processing unit is configured to generate one or more polygon regions for each of the one or more generated address chunks based on said chunking. The processing unit is thereafter configured to merge one or more generated polygon regions for each of the one or more generated address chunks. The processing unit is configured to merge, one or more generated polygon regions for each of the one or more address chunks, based on geographical intersection and a text similarity of said one or more polygon regions, and the text similarity between one or more chunks. Further the system comprises a storage unit, configured to store said merged one or more generated polygon regions, along with their respective chunks. Also the system also comprises an identification unit configured to receive a new address for geocoding, wherein the processing unit is further configured to pre-process and chunk said new address based on an end token score and a sub-sequence token score of the new address to generate one or more address chunks of said new address. Further said pre-processing comprises at least one of a removal of irrelevant characters, a segmentation of concatenated tokens and a removal of typographical errors. Thereafter, the identification unit is further configured to retrieve one or more polygons from a storage unit based on a chunk similarity metric for said one or more address chunks of said new address that is to be geocoded. Further identification unit is configured to rank said retrieved one or more polygons based on a ranking criteria. Also, said ranking is based on one or more metrics and the top ranked polygon/centroid of the top ranked polygon, represents the geolocation of said new address.

BRIEF DESCRIPTION OF THE DRAWINGS

The accompanying drawings, which are incorporated herein, and constitute a part of this disclosure, illustrate exemplary embodiments of the disclosed methods and systems in which like reference numerals refer to the same parts throughout the different drawings. Components in the drawings are not necessarily to scale, emphasis instead being placed upon clearly illustrating the principles of the present disclosure. Some drawings may indicate the components using block diagrams and may not represent the internal circuitry of each component. It will be appreciated by those skilled in the art that disclosure of such drawings includes disclosure of electrical components, electronic components or circuitry commonly used to implement such components.

The foregoing shall be more apparent from the following more detailed description of the disclosure.

DETAILED DESCRIPTION

In the following description, for the purposes of explanation, various specific details are set forth in order to provide a thorough understanding of embodiments. It will be apparent, however, that embodiments may be practiced without these specific details. Several features described hereafter can each be used independently of one another or with any combination of other features. An individual feature may not address any of the problems discussed above or might address only some of the problems discussed above. Some of the problems discussed above might not be fully addressed by any of the features described herein.

The technologies provide a solution relating to geocoding of one or more addresses. The technologies encompass building at least one reference data corpus from one or more historical delivery data (delivery data corpus), to determine the geolocation of one or more addresses. The technologies can comprise receiving from a delivery data corpus, a delivery data comprising one or more addresses with delivered location. The technologies can further comprise identifying, one or more tokens from said one or more addresses. Further the technologies can comprise chunking of addresses into one or more tokens, by calculating an end token score and a sub-sequence token score. Thereafter the technologies can comprise generating, one or more polygon regions for each of the one or more chunks extracted from the addresses. The technologies can also thereafter encompass merging of one or more generated polygon regions. The technologies can encompass merging from said one or more generated polygon regions, two or more similar polygon regions, wherein said merging further leads to a generation of one or more final merged polygons. The one or more merged polygons thereafter stored along with one or more respective chunks, to be retrieved later.

To briefly describe the polygon merging process, consider an exemplary event indicating four polygon regions A, B, C and D, generated for one or more chunks in accordance with the implementation of the features. In said instance, if the polygon regions A and C are similar polygon regions and therefore as per the implementation, the polygon regions A and C are merged into a final merged polygon region E. Further we will store B, D and E polygons where E is the merged polygon of A and C, along with their representative chunks.

Further, in order to geocode a new address, one or more stored polygons in accordance with the implementation are accessed and ranked in an order. The top ranked polygon or its centroid represents the geolocation of the address.

As used herein, a "processing unit" or "processor" includes one or more processors, wherein processor refers to any logic circuitry for processing instructions. A processor may be a general-purpose processor, a special purpose processor, a conventional processor, a digital signal processor, a plurality of microprocessors, one or more microprocessors in association with a DSP core, a controller, a microcontroller, Application Specific Integrated Circuits, Field Programmable Gate Array circuits, any other type of integrated circuits, etc. The processor may perform signal coding data processing, input/output processing, and/or any other functionality that enables the working of the system according to the present disclosure. More specifically, the processor or processing unit is a hardware processor.

As used herein, a "storage unit" refers to a machine or computer-readable medium including any mechanism for storing information in a form readable by a computer or similar machine. For example, a computer-readable medium includes read-only memory ("ROM"), random access memory ("RAM"), magnetic disk storage media, optical storage media, flash memory devices or other types of machine-accessible storage media.

As used herein, an "identification unit" may be an intelligent unit having an analyzing, computing, comparing and identifying capability, and/or any other such similar unit configured to implement the features and is obvious to a person skilled in the art.

The technologies are further explained in detail below with reference now to the diagrams.

Figure 1:
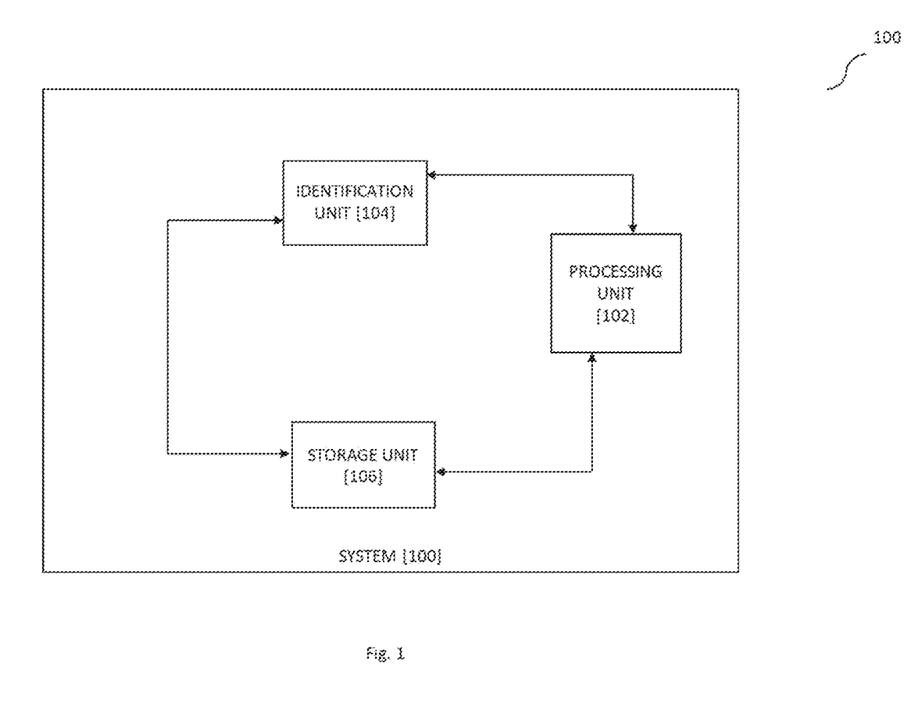
FIG. 1 illustrates a block diagram of an exemplary system [100] for geocoding, in accordance with exemplary embodiment of the present disclosure.

FIG. 1 illustrates an exemplary block diagram of a system [100] for geocoding one or more addresses, in accordance with the exemplary embodiments.

The system [100] comprises at least one processing unit [102], at least one storage unit [106] and at least one identification unit [104], wherein all the components are assumed to be connected to each other unless otherwise indicated below. Also, in FIG. 1 only few units/components are shown, however the system [100] may comprise multiple such units or the system [100] may comprise any such numbers of said units, obvious to a person skilled in the art or as required to implement the features.

The processing unit [102], is configured to receive from a delivery data corpus, a delivery data comprising one or more addresses along with their GPS coordinates. The delivery data corpus relates to one or more historical delivery data. Further the delivery data corpus includes but not limited to one or more delivery data entries, wherein each entry comprises at least one customer address field, city, state, pin code, GPS delivery coordinates and GPS accuracy. The customer address field may be a free text field that contains text entered by the customer and may contain information such as building number, building name, sub-locality, locality, etc. Delivery coordinates include latitude-longitude for the customer address when order was delivered. GPS accuracy refers to the accuracy of the GPS where the location of the address was captured.

The processing unit [102] is further configured to pre-process said customer address field of said received delivery data, wherein said pre-processing may comprises at least one of a removal of special characters, a removal of uppercase characters, a removal of alphanumeric characters, a segmentation of concatenated tokens and a removal of typographical errors. The pre-processing encompasses eliminating noise from the received delivery data. Further the removal of special characters includes removing certain special characters that may be irrelevant for the customer address field. The irrelevant identified special character/s are thereafter removed by the processing unit [102]. The processing unit [102] is further configured to pre-process said delivery data by segmentation of concatenated tokens. The segmentation of concatenated tokens encompasses dividing the concatenated tokens received in said one or more addresses associated with said delivery data, into two or more segments. For instance, concatenated tokens such as "saheedpath" are broken down or segmented into "saheed" and "path". Further, such segmented tokens are further subjected to the typographical error correction by the processing unit [102]. Therefore, the processing unit [102] is also configured to remove typographical errors even after segmentation of concatenated tokens.

The processing unit [102] is further configured to calculate for each of said one or more tokens identified from said delivery data corpus, an end token score and a sub-sequence token score. In one embodiment the processing unit [102] is configured to calculate the score of token being an end token based on counting the number of entities which have the token as an end token. Also, in an embodiment, the processing unit [102] is further configured to calculate the score of a token appearing in the sub-sequence of a given length based on a count of the number of entities having the token in their name field.

The processing unit [102] is further configured to chunk, said one or more addresses associated with said delivery data corpus based on said end token score and said sub-sequence token score, to generate one or more address chunks.

Figures 4, 4A, 4B:
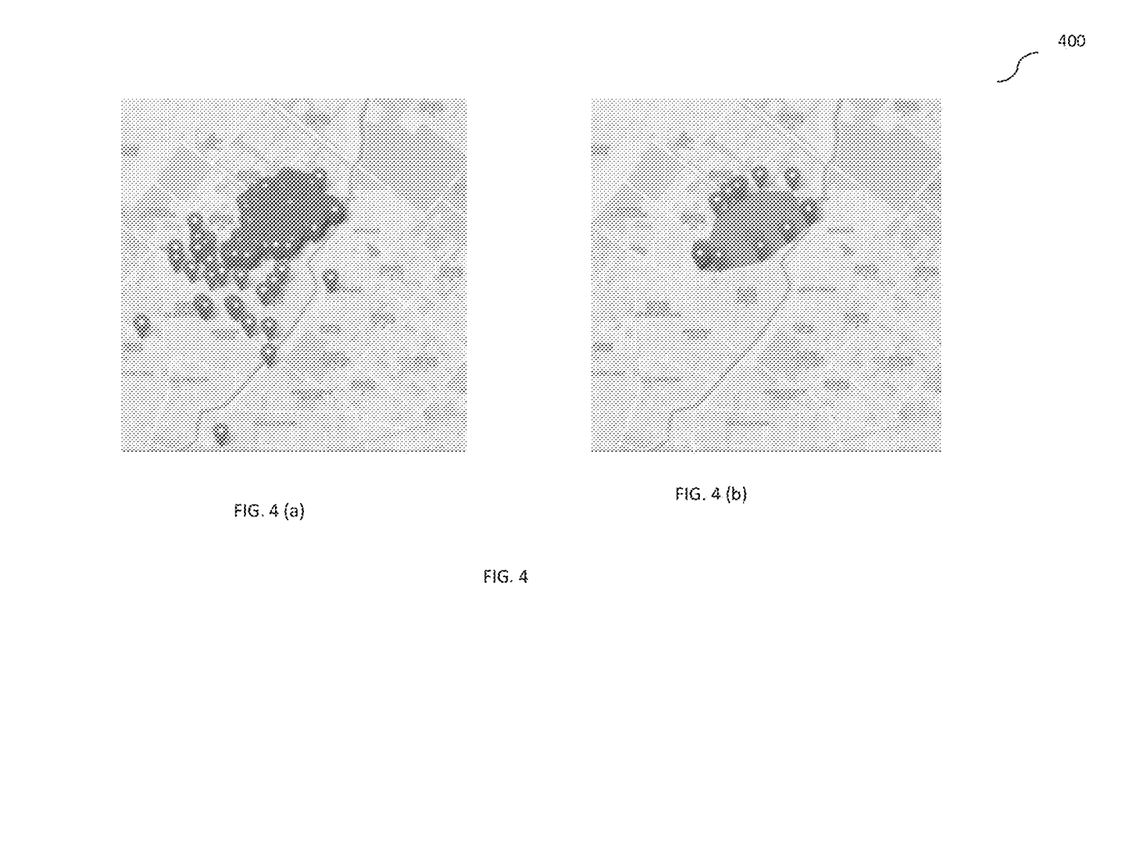
FIG. 4 illustrates the polygon generation step, which is a part of the process for generating a reference data corpus.
FIG. 4(a) illustrates a collection of GPS coordinates corresponding to one or more chunks extracted by the methods presented in the present disclosure.
FIG. 4(b) illustrates the polygons generated by the methods presented in this present disclosure.

Also, the processing unit [102] is further configured to generate one or more polygon regions for each of the one or more chunks based on said chunking of said one or more addresses associated with said delivery data corpus. Further the processing unit [102], in order to generate one or more polygon regions is configured to take a chunk and one or more GPS coordinates from one or more addresses to generate a convex polygon for that chunk. The processing unit [102] is configured to identify and exclude outlier GPS coordinates during the generation of said convex polygon for said chunk. An exemplary representative illustration in FIG. 4 explains the process of said generation of one or more polygons. Further, FIG. 4(a) depicts delivery coordinates from one or more chunks extracted from one or more addresses. FIG. 4(b) is the output of the generation process i.e. a convex polygon that excludes outliers.

Figures 5, 5A, 5B:
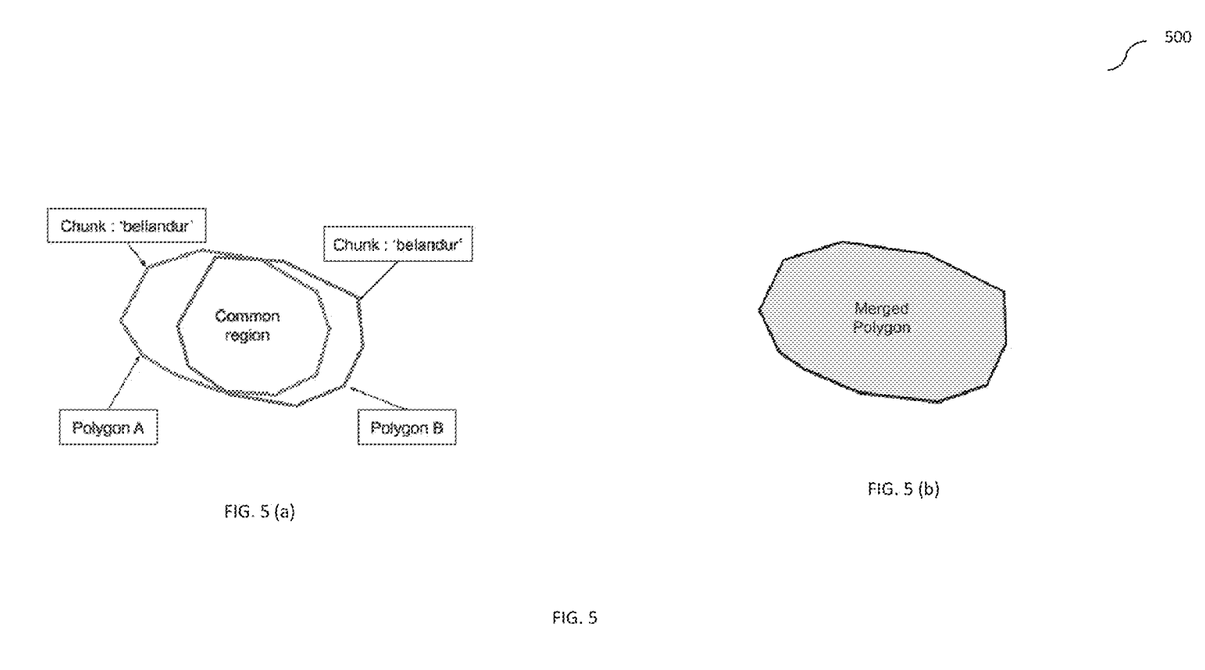
FIG. 5 illustrates the polygon merging step, which is a part of the process for generating a reference data corpus.
FIG. 5(a) illustrates exemplary two polygons for two exemplary address chunks.
FIG. 5(b) illustrates an exemplary merged polygon in accordance with the present disclosure.

Thereafter the processing unit [102] is configured to merge one or more generated polygon regions generated from each address chunk of the one or more addresses. The said merging of one or more generated polygon regions is based on multiple metrics, including text similarity and geographical intersection of said generated one or more polygons. For instance, the processing unit [102] is configured to merge the polygon regions for chunks which point to the same region. One text similarity measure may be Levenshtein distance. The geographical intersection may include the ratio of intersection area between the polygon regions representing the chunks. The merged polygon region/s are the most appropriate latitude-longitude representation of the corresponding one or more chunks. A representative illustration in FIG. 5 explains this process. FIG. 5(a) depicts two exemplary polygons corresponding to two similar chunks with a geographic overlap. The exemplary merged polygon corresponding to these chunks are shown in FIG. 5(b).

The storage unit [106] is connected to the processing unit [102] and the identification unit [104]. The storage unit [106] is configured to store chunks and polygon regions of chunks extracted from one or more addresses and the polygons generated from the aforementioned process. The storage unit [106] is also configured to store one or more pre-processed data generated on the basis of said pre-processing of the customer address field of said delivery data via the processing unit [102]. Also, the storage unit [106] is configured to store at least one map data corpus, wherein the map data corpus comprises of map reference data which includes a hierarchical structure of toponyms with textual information such as names, aliases, and spatial information such as points, lines or polygons. Entities within the map reference data corpus are associated with an admin level, such as state, district, city, sub-district, locality, sub-locality, sub sub-locality, road, junction and pin code. Further, in an event said stored map data corpus may be accessible via one or more units of said system [100] to perform certain tasks such as including but not limited to pre-processing, chunking of addresses and the like.

Further, at the time of geocoding a new address, the identification unit [104] is configured to receive the new address. Thereafter, the address is pre-processed and chunked via the processing unit [102] as explained above. The identification unit [104] is further configured to retrieve one or more polygon regions from the storage unit [106] based on a chunk similarity metric for the one or more chunks identified by the processing unit [102] in the new address. The polygon is retrieved if the similarity score between the stored chunk and the extracted chunk is more than a predefined threshold. The identification unit [104] is further configured to rank the retrieved polygons based on one or more metrics. For instance, the metric may be the number of addresses contained in the polygon. In another example, the metric may be the area of the polygon. The identification unit [104] is further configured to return or determine the top ranked polygon. The polygon or its centroid can represent the geolocation of the new address.

Figure 2:
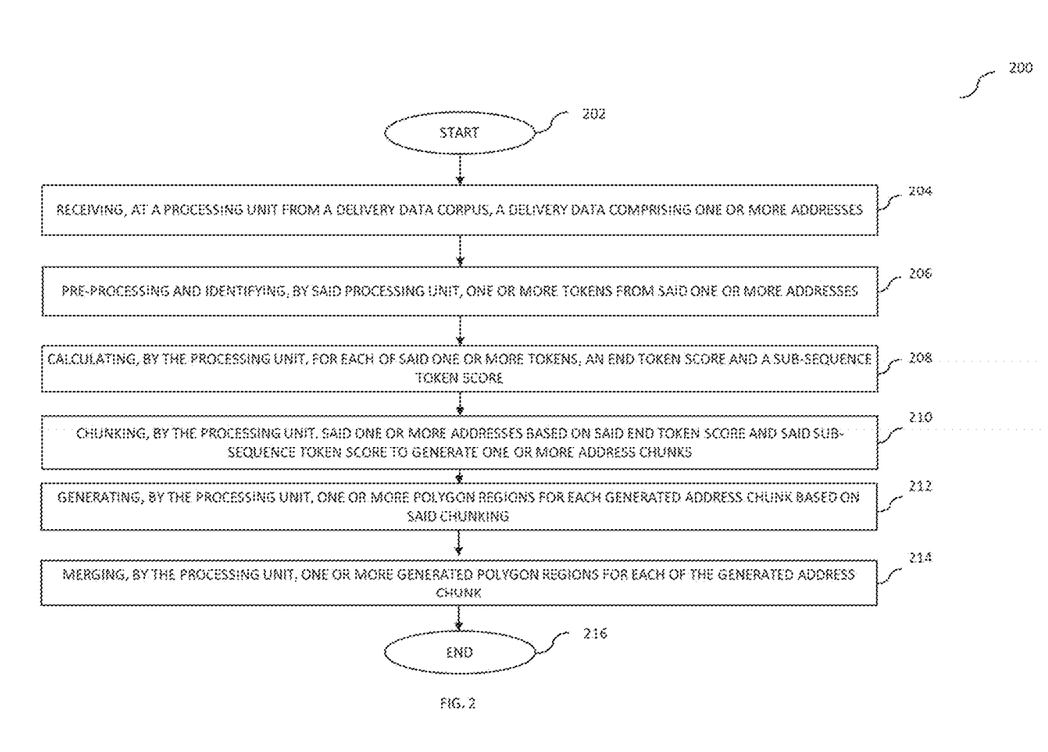
FIG. 2 illustrates an exemplary method flow diagram, depicting a method of generating a new reference data corpus comprising one or more merged polygons for one or more address chunks, given historical delivery data corpus, a delivery data comprising one or more addresses, in accordance with exemplary embodiment of the present disclosure.

Referring to FIG. 2, an exemplary method flow diagram, depicting a method of generating a new reference data corpus comprising one or more merged polygons for one or more address chunks, given historical delivery data corpus, a delivery data comprising one or more addresses. As shown in FIG. 2, the method starts at step [202].

At step [204] the method encompasses receiving, at a processing unit [102] from a delivery data corpus, a delivery data comprising one or more addresses. The delivery data corpus relates to one or more historical delivery data. Further the delivery data corpus includes but not limited to one or more delivery data entries, wherein each entry comprises at least one customer address field, city, state, pin code, delivery coordinates and GPS accuracy. The customer address field may be a free text field that contains text entered by the customer and may contain information such as building number, building name, sub-locality, locality, etc. Delivery coordinates include latitude-longitude for the customer address when order was delivered. GPS accuracy refers to the accuracy of the GPS where the location of the address was captured.

Next, at step [206] the method comprises identifying, by the processing unit [102] one or more tokens/words from said one or more addresses relating to the delivery data corpus. Further the method also encompasses pre-processing said customer address field of said delivery data via the processing unit [102], wherein said pre-processing comprises at least one of a removal of special characters, a removal of uppercase characters, a removal of alphanumeric characters, a segmentation of concatenated tokens and a removal of typographical errors. The pre-processing encompasses eliminating noise from the received delivery data. Further the removal of special characters includes removing certain special characters that may be irrelevant for the customer address field. The method comprises identifying one or more special characters in the received customer address field and thereafter the method determines whether such identified special character/s are relevant for the address mentioned under the customer address field and/or for further processing. The method thereafter encompasses removing irrelevant identified special character/s via the processing unit [102].

Further in one example, the method encompasses pre-processing via the processing unit [102], to pre-process the received delivery data by said removing of alphanumeric characters such that all alphanumeric characters except, "{", "/", "#", ":" and "}" are removed. The method may comprise of pre-processing via the processing unit [102], the received delivery data such that the entire address is converted into lowercase for the ease of further processing.

Also, the method further comprises removing via the processing unit [102], said typographical errors based on a reference corpus unique to a pin code. The method comprises generating a reference corpus/database for each pin code, wherein said reference corpus for a particular pin code comprises all unique address tokens/words occurring in that pin code as well as the address tokens/words in the neighboring pin codes. The method, thereafter comprises identifying via the processing unit [102] at least one word or token from the reference corpus corresponding to the pin code received from the customer in the customer address field of received delivery data, wherein said identification is based on a comparison of one or more words of said reference corpus with at least one detected typographical error words. Further the method comprises detecting via the processing unit [102], at least one matching/similar word/token as that of said identified at least one token, from one or more reference corpus generated from one or more relevant pin codes. Also in an event the matching or the similarity measure may include but not limited to Levenshtein distance. Also, in an event if multiple tokens are identified with the same similarity score, the method encompasses using other means to identify the most suitable token such as by selecting the more frequently used token. Further the method encompasses removing one or more typographical error words via the processing unit [102], on the basis of the identified words from the reference corpus. Further said removing or correcting of typographical errors by comparing typographical error words with the pin code reference corpus words, instead of the entire base-map data, leads to substantially increased efficiency of geocoding one or more addresses.

The method further comprises pre-processing via the processing unit [102], said customer address field of said delivery data, by segmenting one or more concatenated tokens, based on a reference corpus unique to a pin code. The segmentation of concatenated tokens encompasses dividing the concatenated tokens received in said one or more addresses associated with said delivery data, into two or more segments. For instance, concatenated tokens such as "vijaymarg" are broken down or segmented into "vijay" and "marg". Further, such segmented tokens are further subjected to the typographical error correction by the method. Therefore, the method comprises removing the typographical errors even after segmentation of concatenated tokens.

Next, at step [208] the method encompasses calculating, by the processing unit [102], for each of said one or more tokens, an end token score and a sub-sequence token score. The method encompasses calculating by the processing unit [102] the score of token being an end token based on counting the number of entities which have the token as an end token. Also, the method comprises calculating by the processing unit [102] the score of a token appearing in the sub-sequence of a given length based on a count of the number of entities having the token in their name field.

Next, at step [210] the method comprises chunking, by the processing unit [102], said one or more addresses based on said end token score and said sub-sequence token score to generate one or more address chunks.

Next, at step [212] the method encompasses generating, by the processing unit [102], one or more polygon regions for each chunk generated from said one or more addresses based on said chunking of said one or more addresses associated with said delivery data. Further said generation of one or more polygon regions is based on delivery pin code using the delivery latitude-longitudes available in the said delivery data. Final polygon region for the said chunk is created from the said delivery latitude-longitudes of the delivery addresses of which the chunk is a part of, after removing the outlier delivery latitude-longitude.

Further, at step [214] the method comprises merging, by the processing unit [102], one or more generated polygon regions for each of the address chunks generated from one or more addresses. The said merging of one or more generated polygon regions is based on the geographical intersection metric of said one or more polygons and text similarity between the chunks. For instance, the method encompasses merging via processing unit [102], the polygon regions for chunks which point to the same region. In an example, polygon regions are merged in an event the text similarity score between the chunks is greater than a defined threshold and the geographical intersection metric which is defined as the ratio of geographical intersection between the polygon regions representing the chunks with either of the polygon region area is greater than a defined threshold. One text similarity measure may be Levenshtein distance. The merged polygon region/s are the most appropriate latitude-longitude representation of the corresponding chunk generated from said one or more addresses.

Further, the method encompasses the storing of the relevant data extracted from all the steps to the storage unit [106]. The method comprises saving the chunks and the corresponding polygon region extracted from the said delivery data consisting of one or more delivery addresses.

Furthermore, the method thereafter encompasses geocoding a new address via the identification unit [104], wherein, after the address is chunked, polygon regions are retrieved from the storage unit [106] based on chunk similarity metric for one or more chunks in the new address. The polygon is retrieved if the similarity score is more than a predefined threshold. The retrieved polygons are then ranked based on one or more metrics.

After successful geocoding of the one or more addresses, the method further terminates at step [216].

Figure 3:
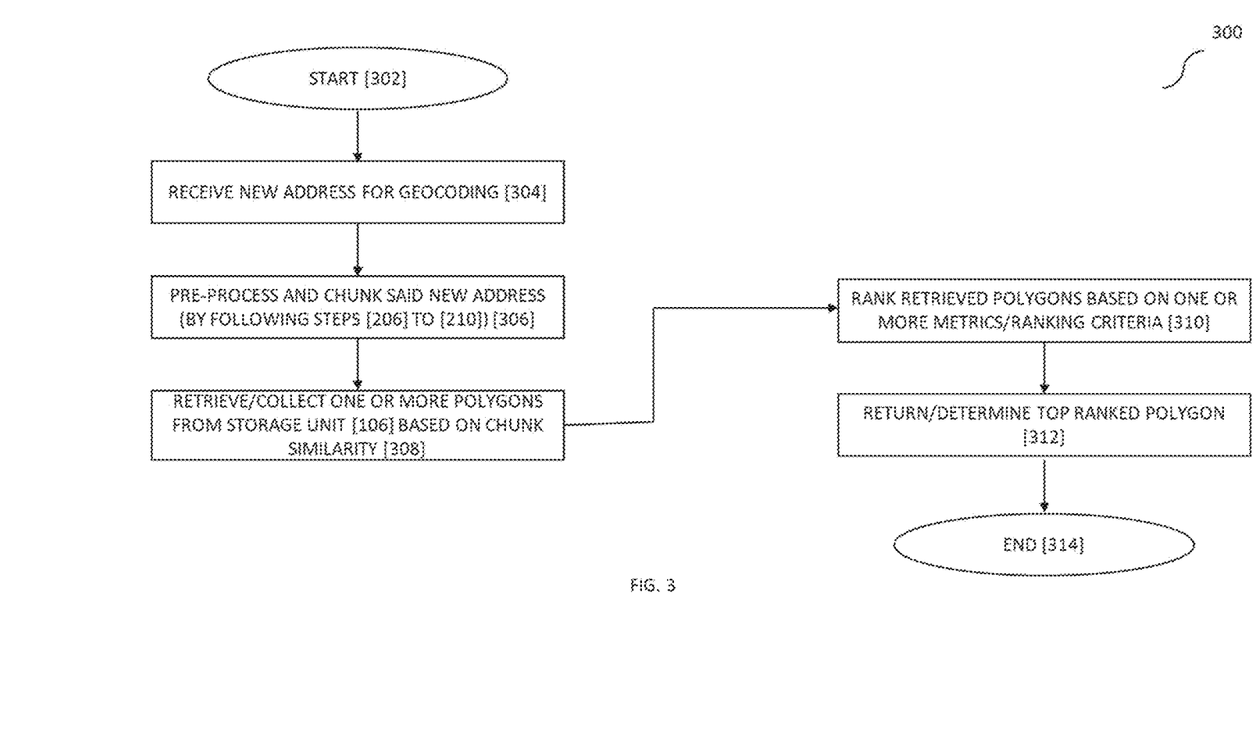
FIG. 3 illustrates an exemplary method for predicting the geocode or representative polygon for a new address, in accordance with exemplary embodiment of the present disclosure.

FIG. 3 illustrates geocoding of a new address in accordance with exemplary embodiments. The method [300] begins at step [302]. The technologies can encompass beginning of the method [300] once polygon generation, merging and storage has already been done as per the method [200].

At step [304], the identification unit [104] receives the new address under consideration for geocoding. The next step [306] involves pre-processing and chunking the new address following steps 206-210 which has been described in more detail with reference to FIG. 2.

Thereafter, the retrieval step [308] is performed wherein one or more polygons are retrieved from the storage unit [106] based on the chunk similarity metric for one or more chunks. The chunk similarity metric is calculated for each of the polygons stored in the storage unit [106]. If the chunk similarity metric for a chunk of the new address is above a predefined threshold, then such a polygon is retrieved by the identification unit [104] in this step.

The ranking step [310] then ranks the retrieved polygons based on one or more metrics. An example metric may be the number of addresses contained in the polygon. Another example metric may be the area of the polygon.

The next step [312] returns the top ranked polygon. The polygon or its centroid can represent the geolocation of the new address.

After successful geocoding of the new addresses, the method further terminates at step [314].

While considerable emphasis has been placed herein on the disclosed embodiments, it will be appreciated that many embodiments can be made and that many changes can be made to the embodiments without departing from the principles of the present invention. These and other changes in the embodiments of the present invention will be apparent to those skilled in the art, whereby it is to be understood that the foregoing descriptive matter to be implemented is illustrative and non-limiting.

We claim:

1. A method (200) for geocoding, the method comprising:
   receiving, at a processing unit (102) from a delivery data corpus, a delivery data comprising one or more addresses;
   identifying, by said processing unit (102), one or more tokens from said one or more addresses;
   calculating, by the processing unit (102), for each of said one or more tokens, an end token score and a sub-sequence token score;
   chunking, by the processing unit (102), said one or more addresses based on said end token score and said sub-sequence token score to generate one or more address chunks;
   generating, by the processing unit (102), one or more polygon regions for each generated address chunk based on said chunking and a corresponding geographical location of each generated address chunk; and
   merging, by the processing unit (102), one or more generated polygon regions for each of the generated address chunk, wherein said merging, by the processing unit (102), one or more generated polygon regions for each the one or more address chunks is based on geographical intersection of said one or more polygon regions and a text similarity score between the address chunks is greater than a pre-defined threshold.

2. The method as claimed in claim 1, wherein the delivery data comprises at least one selected from the group consisting of a customer address field, a delivery coordinates, and a GPS accuracy.

3. The method as claimed in claim 1, further comprising:
   pre-processing said customer address field of said delivery data, wherein said pre-processing comprises at least one selected from the group consisting of a removal of special characters, a removal of uppercase characters, a removal of alphanumeric characters, a segmentation of concatenated tokens, and a removal of typographical errors.

4. The method as claimed in claim 3, wherein said removal of at least one of said typographical errors and said segmentation of concatenated tokens is based on a reference corpus unique to a pin code.

5. The method as claimed in claim 1, the method further comprising:
   receiving, by an identification unit (104), a new address for geocoding;
   pre-processing, by the processing unit (102) said new address, wherein said pre-processing comprises at least one of a removal of irrelevant characters, a segmentation of concatenated tokens and a removal of typographical errors;
   chunking, by the processing unit (102), said pre-processed new address based on an end token score and a sub-sequence token score of the new address to generate one or more address chunks of said new address;
   retrieving, by the identification unit (104), one or more polygons from a storage unit (106) based on a chunk similarity metric for said one or more address chunks of said new address; and
   ranking, by the identification unit (104), said retrieved one or more polygons based on a ranking criteria.

6. A system (100) for geocoding, the system comprising:
   a processing unit (102) configured to:
      receive from a delivery data corpus, a delivery data comprising one or more addresses;
      identify one or more tokens from said one or more addresses;
      calculate, for each of said one or more tokens, an end token score and a sub-sequence token score,
      chunk, said one or more addresses based on said end token score and said sub-sequence token score to generate one or more address chunks,
      generate, one or more polygon regions for each of the one or more generated address chunks based on said chunking and a corresponding geographical location of each of the one or more generated address chunks, and
      merge, one or more generated polygon regions for each of the one or more generated address chunks, wherein the processing unit (102) configured to merge, one or more generated polygon regions for each the one or more address chunks is based on geographical intersection of said one or more polygon regions and a text similarity score between the address chunks is greater than a pre-defined threshold.

7. The system as claimed in claim 6, wherein the delivery data comprises at least one selected from the group consisting of a customer address field, a delivery coordinates and a GPS accuracy.

8. The system as claimed in claim 6, wherein the processing unit (102) is further configured to:
   pre-process said customer address field of said delivery data, wherein said pre-processing comprises at least one selected from the group consisting of a removal of special characters, a removal of uppercase characters, a removal of alphanumeric characters, a segmentation of concatenated tokens and a removal of typographical errors.

9. The system as claimed in claim 8, wherein said removal of at least one of said typographical errors and the segmentation of concatenated tokens is based on a reference corpus unique to a pin code.

10. The system as claimed in claim 6, further comprising an identification unit (104) configured to receive a new address for geocoding,
    wherein
       the processing unit (102) is further configured to:
          pre-process said new address, wherein said pre-processing comprises at least one of a removal of irrelevant characters, a segmentation of concatenated tokens and a removal of typographical errors, and
          chunk said pre-processed new address, wherein said chunking is based on an end token score and a sub-sequence token score of the new address to generate one or more address chunks of said new address, and
       wherein the identification unit (104) is further configured to:
          retrieve one or more polygons from a storage unit (106) based on a chunk similarity metric for said one or more address chunks of said new address, and
          rank said retrieved one or more polygons based on a ranking criteria.

11. One or more non-transitory computer-readable media comprising computer-executable instructions that, when executed by a computing system, cause the computing system to perform a method (200) for geocoding, the method comprising:
    receiving, at a processing unit (102) from a delivery data corpus, a delivery data comprising one or more addresses;
    identifying, by said processing unit (102), one or more tokens from said one or more addresses;
    calculating, by the processing unit (102), for each of said one or more tokens, an end token score and a sub-sequence token score;
    chunking, by the processing unit (102), said one or more addresses based on said end token score and said sub-sequence token score to generate one or more address chunks;
    generating, by the processing unit (102), one or more polygon regions for each generated address chunk based on said chunking and a corresponding geographical location of each generated address chunk; and
    merging, by the processing unit (102), one or more generated polygon regions for each of the generated address chunk, wherein said merging, by the processing unit (102), one or more generated polygon regions for each the one or more address chunks is based on geographical intersection of said one or more polygon regions and a text similarity score between the address chunks is greater than a pre-defined threshold.

* * * * *